United States Patent
Park et al.

(10) Patent No.: US 8,848,542 B2
(45) Date of Patent: Sep. 30, 2014

(54) METHOD FOR EFFICIENTLY PERFORMING COVERAGE LOSS OPERATION DURING SLEEP MODE IN A BROADBAND WIRELESS ACCESS SYSTEM

(75) Inventors: Gi Won Park, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 324 days.

(21) Appl. No.: 13/023,207

(22) Filed: Feb. 8, 2011

(65) Prior Publication Data

US 2011/0194420 A1 Aug. 11, 2011

Related U.S. Application Data

(60) Provisional application No. 61/302,478, filed on Feb. 8, 2010.

(30) Foreign Application Priority Data

Oct. 28, 2010 (KR) .......................... 10-2010-0105885

(51) Int. Cl.
  H04J 1/16 (2006.01)
  H04W 52/02 (2009.01)
  H04W 28/04 (2009.01)
  H04W 24/00 (2009.01)

(52) U.S. Cl.
  CPC .......... *H04W 52/0241* (2013.01); *H04W 28/04* (2013.01); *H04W 24/00* (2013.01)
  USPC ........................................................ 370/242

(58) Field of Classification Search
  None
  See application file for complete search history.

(56) References Cited

U.S. PATENT DOCUMENTS

| 8,204,555 | B2 | 6/2012 | Yanover | |
| 2008/0182567 | A1 | 7/2008 | Zhu et al. | |
| 2009/0135755 | A1* | 5/2009 | Qi et al. | 370/311 |
| 2010/0008278 | A1* | 1/2010 | Kone et al. | 370/311 |
| 2011/0044307 | A1* | 2/2011 | Mohanty et al. | 370/338 |
| 2011/0110227 | A1* | 5/2011 | Yang et al. | 370/228 |

FOREIGN PATENT DOCUMENTS

CN 101040550 A 9/2007

OTHER PUBLICATIONS

Chunmei Liu, Masoud Olfat, Ranging procedure in coverage loss declaration (section 16.2.26), Jan. 12, 2010, IEEE C802.16m-09/3033r2,2-3.*

Chunmei Liu, Masoud Olfat, Ranging procedure in coverage loss declaration (section 16.2.26), Jan. 12, 2010, IEEE C802.16m09/3033r2,2-3.*

(Continued)

*Primary Examiner* — Chi Pham
*Assistant Examiner* — Kouroush Mohebbi
(74) *Attorney, Agent, or Firm* — Birch, Stewart, Kolasch & Birch, LLP

(57) ABSTRACT

A method for detecting coverage loss during a sleep mode of a mobile station and an apparatus for performing the same are disclosed. The method for detecting coverage loss of a mobile station, which is operated in a sleep mode, in a broadband wireless access system comprises the steps of awaking regardless of a sleep window of a sleep cycle at a first time when a super frame header (SFH) is transmitted from a serving base station; detecting the super frame header; and operating for the sleep window or listening window in accordance with the sleep cycle if the detected result is successful, and awaking until the super frame header is successfully detected if the detected result is failed.

14 Claims, 9 Drawing Sheets

(56) References Cited

OTHER PUBLICATIONS

Clearwire et al., "Proposed text on coverage loss (section 15.2.x and 15.2.3.x)," IEEE 802.16 Broadband Wireless Access Working Group <http://ieee802.org/16>, Nov. 19, 2009, 8 pages.

Clearwire et al., "Ranging procedure in coverage loss declaration (section 16.2.26)," IEEE 802.16 Broadband Wireless Access Working Group <http://ieee802.org/16> Jan. 12, 2010, 3 pages.

Samsung Electronics et al., "MS identification during coverage loss recovery procedure (16.2.26)," IEEE 802.16 Broadband Wireless Access Group <http://ieee802.org/16>, Dec. 30, 2009, 7 pages.

Samsung Electronics, "Proposed text on coverage loss (section 15.2.10)," IEEE 802.16 Broadband Wireless Access Working Group <http://ieee802.org/16>, Nov. 6, 2009, 3 pages.

01 et al., "Sleep Mode Operation in 16m," IEEE 802.16 Broadband Wireless Access Working Group <http://ieee802.org/16>, IEEE C802.16m-09/0591r3, Mar. 2, 2009, 12 pages.

\* cited by examiner

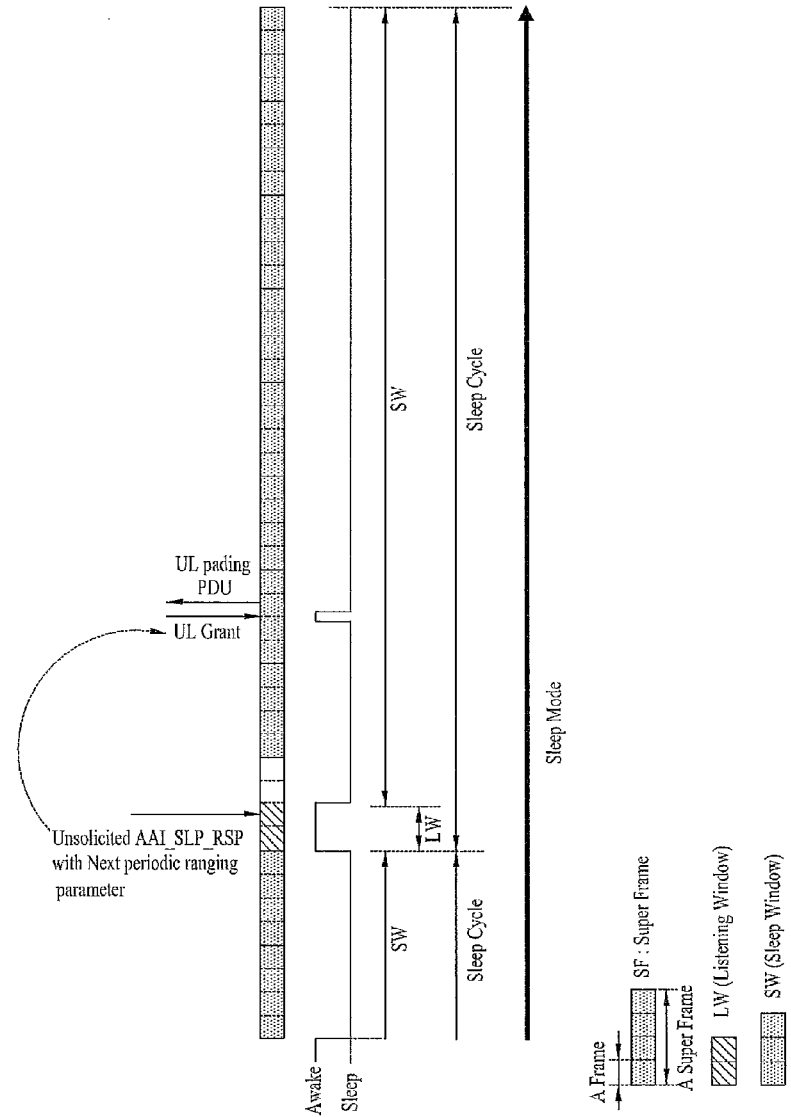

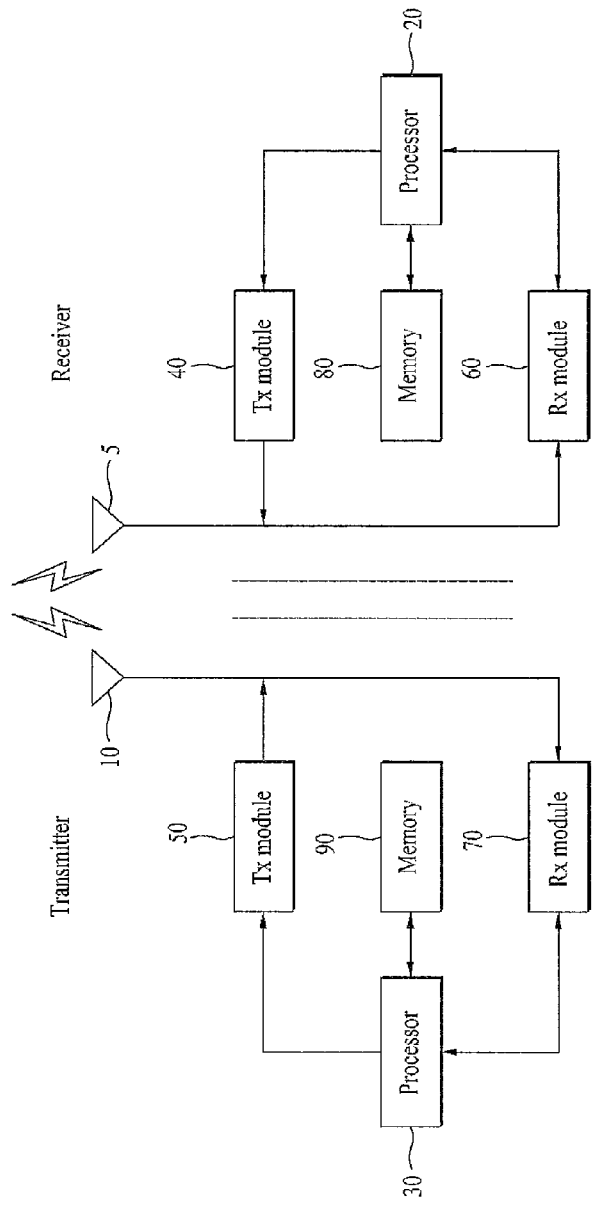

METHOD FOR EFFICIENTLY PERFORMING COVERAGE LOSS OPERATION DURING SLEEP MODE IN A BROADBAND WIRELESS ACCESS SYSTEM

This application claims the benefit of the Korean Patent Application No. 10-2010-0105885, filed on Oct. 28, 2010, which is hereby incorporated by reference as if fully set forth herein.

This application also claims the benefit of U.S. Provisional Application Ser. No. 61/302,478, filed on Feb. 8, 2010 the contents of which are hereby incorporated by reference in their entirety.

BACKGROUND OF THE INVENTION

1. Field of the Invention

The present invention relates to a broadband wireless access system, and more particularly, to a method for detecting coverage loss during a sleep mode of a mobile station and an apparatus for performing the same.

2. Discussion of the Related Art

It is important that a mobile station with a power source dependent upon a battery for mobility reduces power consumption. In this respect, various methods for reducing power consumption have been suggested. One of the methods is a sleep mode.

The sleep mode means that an operation of a mobile station having no traffic for transmission and reception with a base station is stopped to reduce power consumption.

If the mobile station which is performing communication with the base station in a normal mode or active mode has no traffic for transmission and reception with the base station any more, it transmits a sleep request (MOB_SLP-REQ or AAI_SLP-REQ) message to the base station to enter a sleep mode. The base station that has received the sleep request message transmits a sleep response (MOB_SLP-RSP or AAI_SLP-RSP) message to the mobile station, wherein the sleep response message includes parameters related to the sleep mode of the mobile station, such as initial sleep cycle and a listening window (LW).

The mobile station that has received the sleep response message enters the sleep mode by using the parameters related to the sleep mode.

The mobile station alternately repeats a sleep interval and a listening interval. The mobile station can transmit and receive data to and from the base station for the listening interval. Since the mobile station cannot transmit and receive data to and from the base station for the sleep interval, the data transmitted to the base station for the sleep interval are buffered.

The aforementioned sleep mode operation will be described in more detail with reference to FIG. 1.

FIG. 1 is a diagram illustrating an example of a sleep mode operation procedure of a mobile station in a general IEEE 802.16 system.

Referring to FIG. 1, after the mobile station shifts from a normal mode to a sleep mode, its first sleep cycle includes a sleep window only. Each of a second sleep cycle to the last sleep cycle of the mobile station includes a sleep window and a listening window. The first sleep cycle has a length of an initial sleep cycle included in a sleep response message.

The mobile station receives a traffic indication (TRF-IND) message from the base station for the listening window, wherein the traffic indication message indicates whether there is traffic for transmission to the mobile station in the base station. If the traffic indication message includes negative indication, it means that there is no traffic for transmission to the mobile station in the base station. If the traffic indication message includes positive indication, it means that there is traffic for transmission to the mobile station in the base station.

In FIG. 1, if the traffic indication message, which includes negative indication, is received for the listening window of the second sleep cycle, the mobile station determines whether there is no traffic for transmission to a downlink, and increases the sleep cycle as much as twice more than a previous sleep cycle.

If the mobile station receives the traffic indication message, it increases the sleep cycle in accordance with the following Equation 1.

$$\text{Current sleep cycle} = \min(2*\text{previous sleep cycle}, \text{final sleep cycle}) \quad [\text{Equation 1}]$$

Referring to the Equation 1, the mobile station sets the current sleep cycle to a smaller value of twice of the previous sleep cycle and the last sleep cycle included in the sleep response message. In other words, the mobile station cannot set the sleep cycle to be greater than the last sleep cycle. This is to prevent the sleep cycle from being continuously increased.

If the mobile station receives the traffic indication message, which includes positive indication, for the listening window of the third sleep cycle, it resets the sleep cycle to the initial sleep cycle.

Afterwards, the mobile station can transmit and receive traffic to and from the base station for the listening window included in the MOB_SLP-RSP message. At this time, if the mobile station fails to end transmission and reception of traffic to and from the base station for the listening window included in the sleep response message, it continues to transmit and receive traffic to and from the base station by extending the listening window. If the mobile station which is transmitting and receiving traffic to and from the base station for the extended listening window receives the last PDU indicator or a listening window end flag from the base station, it stops extension of the listening window and enters the sleep window.

In the IEEE 802.16m system, the MOB_SLP-REQ/RSP messages may be replaced with AAI_SLP-REQ/RSP messages, respectively. Also, the mobile station is allocated with a sleep cycle identifier (SCID) suitable for its traffic properties through AAI_SLP-REQ/RSP message exchange when entering the sleep mode. The SCID is an identifier for the mobile station of the sleep mode, and is mapped into parameters (initial sleep cycle, listening window length, TIMF flag, LWEF flag, final sleep cycle, NSCF, T_AMS timer, etc.) used after the mobile station enters the sleep mode. Also, the mobile station and the base station can perform SCID switching or change the parameter values mapped into the SCID for the sleep mode by considering traffic properties of the mobile station.

In the mean time, uplink data may not be transmitted from a mobile station for a certain time period or feedback (ACK or NACK) of downlink data may not be transmitted to a base station. At this time, the base station can facilitate network re-entry of the mobile station by triggering a resource retain timer and storing connection information (context) of the mobile station. This method is provided implicitly in a general mobile communication system. Since the timing and basis that the base station determines that the mobile station has lost network coverage are not definite, the base station should unnecessarily store the connection information of the mobile station.

In this respect, in a general IEEE 802.16m system, a deregistration with context retention (DCR) mode and a coverage loss recovery mode are defined due to a problem that may occur due to non-synchronization between a serving base station and a mobile station if the mobile station loses service coverage of the serving base station.

However, since the mobile station which is being operated in the sleep mode performs normal data transmission and reception for the listening window only, an operation procedure of determining coverage loss and an operation procedure how to perform network re-entry if coverage loss occurs are not defined.

SUMMARY OF THE INVENTION

Accordingly, the present invention is directed to a method for efficiently performing coverage loss operation during sleep mode in a broadband wireless access system, which substantially obviates one or more problems due to limitations and disadvantages of the related art.

An object of the present invention is to provide a method for detecting coverage loss during a sleep mode of a mobile station and an apparatus for performing the same.

Another object of the present invention is to provide a method for efficient network re-entry if a mobile station of a sleep mode detects coverage loss and an apparatus for performing the same.

It will be appreciated by persons skilled in the art that the objects that can be achieved by the present invention are not limited to what has been particularly described hereinabove and the above and other objects that the present invention can achieve will be more clearly understood from the following detailed description taken in conjunction with the accompanying drawings.

To achieve these objects and other advantages and in accordance with the purpose of the invention, as embodied and broadly described herein, a method for detecting coverage loss of a mobile station, which is operated in a sleep mode, in a broadband wireless access system comprises the steps of awaking regardless of a sleep window of a sleep cycle at a first time when a super frame header (SFH) is transmitted from a serving base station; detecting the super frame header; and operating for the sleep window or listening window in accordance with the sleep cycle if the detected result is successful, and awaking until the super frame header is successfully detected if the detected result is failed.

At this time, the first time is preferably the time when the super frame header directly before the sleep window ends is transmitted.

Also, the method further comprises the steps of scanning a new channel if the detecting step of the super frame header is failed continuously as much as the number of previously set times; transmitting a first message to a base station discovered as a result of the scanning step, the first message including an identifier for identifying the mobile station in respect of connection information (context) of the mobile station and a ranging purpose indication field set to a value indicating network re-entry due to coverage loss; and receiving a second message from the discovered base station, the second message including optimization information indicating a procedure that can be omitted during the network re-entry.

Also, the method further comprises the steps of transmitting a handover ranging code to the discovered base station; receiving a third message from the discovered base station, the third message including the transmitted result of the handover ranging code; and receiving uplink resource allocation information from the discovered base station if the transmitted result is successful, wherein the step of transmitting a first message is performed using an uplink resource indicated by the uplink resource allocation information.

Preferably, the first message is a ranging request (AAI_RNG-REQ) message, the second message is a ranging response (AAI_RNG-RSP) message, the third message is a ranging acknowledgement (AAI_RNG-ACK) message, the identifier is a context retention identifier (CRID), the value indicating network re-entry due to coverage loss is 0b1000, and the optimization information is a re-entry process optimization parameter.

In another aspect of the present invention, a method for determining coverage loss of a mobile station, which is operated in a sleep mode, at a base station of a broadband wireless access system comprises the steps of transmitting first uplink resource allocation information (UL grant) to the mobile station for a listening window closest to the time when a first timer managed by the base station expires for the mobile station; and resetting the first timer if a response signal is received from the mobile station through an uplink resource indicated by the first uplink resource allocation information and transmitting at least one second uplink resource allocation information to the mobile station until the response signal is received if the response signal is not received from the mobile station.

At this time, the method further comprises the steps of transmitting a first message for requesting ranging to the mobile station and starting a second timer if the response signal is not received from the mobile station continuously as much as the number of previously set times; and restarting the first timer if a second message indicating that the ranging has been successfully performed is received from the mobile station before the second timer expires.

Also, the method further comprises the step of starting a third timer if the second message is not received from the mobile station before the second timer expires.

Also, the response signal includes a media access control protocol data unit (MAC PDU), which includes predetermined data, and a bandwidth request (BR) header having a BR size of 0.

Preferably, the first message is an unsolicited ranging response (AAI_RNG-RSP) message, the second message is a ranging confirmation (AAI_RNG-CFM) message, the first timer is an active base station timer (Active_BS_Timer), the second timer is a T58 timer, and the third timer is a resource retain timer.

In other aspect of the present invention, a mobile station apparatus of performing a sleep mode in a broadband wireless access system comprises a processor; and a radio frequency (RF) module for transmitting and receiving a radio signal to and from the outside under the control of the processor, wherein the processor awakes from the sleep mode regardless of a sleep window of a sleep cycle at a first time when a super frame header (SFH) is transmitted from a serving base station, detects the super frame header, operates for the sleep window or listening window in accordance with the sleep cycle if the detected result is successful, and awakes until the super frame header is successfully detected if the detected result is failed.

At this time, the first time is preferably the time when the super frame header directly before the sleep window ends is transmitted.

Also, the processor scans a new channel if it fails to detect the super frame header continuously as much as the number of previously set times, transmits a first message to a base station discovered as a result of the scanning, the first message including an identifier for identifying the mobile station in respect of connection information (context) of the mobile station and a ranging purpose indication field set to a value indicating network re-entry due to coverage loss, and receives a second message from the discovered base station, the second message including optimization information indicating a procedure that can be omitted during the network re-entry.

Also, the processor transmits a handover ranging code to the discovered base station, receives a third message from the discovered base station, the third message including the transmitted result of the handover ranging code, and receives uplink resource allocation information from the discovered base station if the transmitted result is successful, wherein the first message is transmitted using an uplink resource indicated by the uplink resource allocation information.

Preferably, the first message is a ranging request (AAI_RNG-REQ) message, the second message is a ranging response (AAI_RNG-RSP) message, the third message is a ranging acknowledgement (AAI_RNG-ACK) message, the identifier is a context retention identifier (CRID), the value indicating network re-entry due to coverage loss is 0b1000, and the optimization information is a re-entry process optimization parameter.

According to the embodiments of the present invention, the following advantages can be obtained.

First of all, the mobile station which is being operated in the sleep mode awakes until it normally receives a super frame header, whereby the mobile station can determine coverage loss.

In addition, it is efficient that the mobile station which is being operated in the sleep mode can perform the optimized network re-entry procedure through the network re-entry procedure disclosed in the embodiments of the present invention.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 is a diagram illustrating an example of a sleep mode operation procedure of a mobile station according to further still another embodiment of the present invention; and FIG. 9 is a block diagram illustrating an example of a transmitter and a receiver according to another embodiment of the present invention.

DETAILED DESCRIPTION OF THE INVENTION

Figure 1:
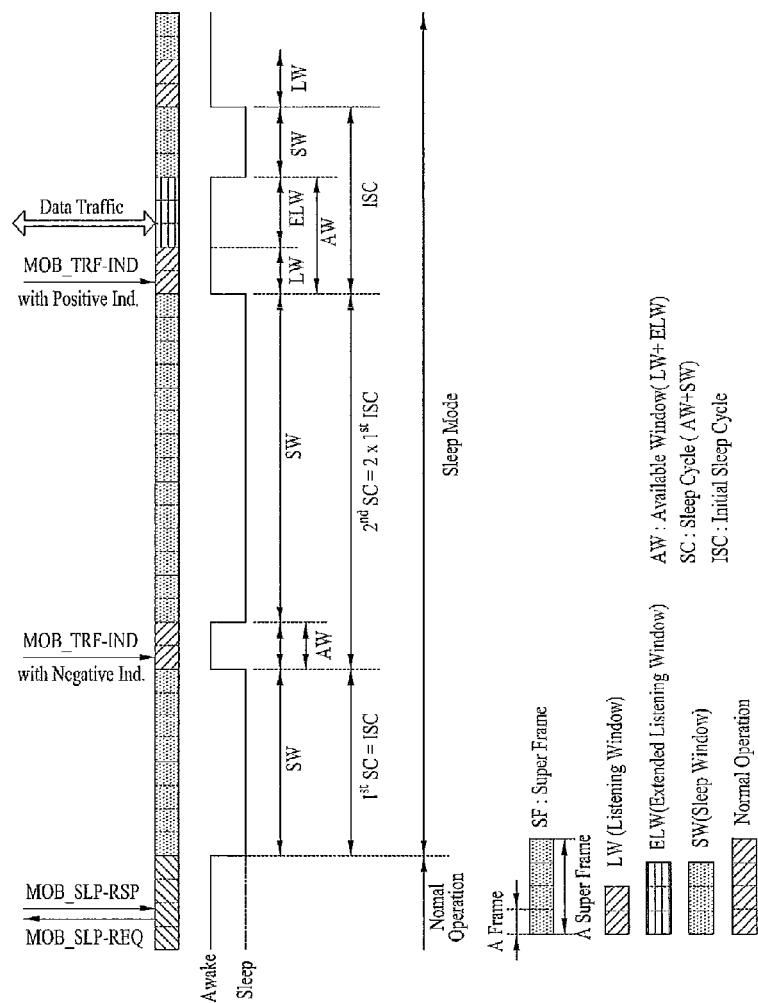
FIG. 1 is a diagram illustrating an example of a sleep mode operation procedure of a mobile station in a general IEEE 802.16 system.

Reference will now be made in detail to the preferred embodiments of the present invention, examples of which are illustrated in the accompanying drawings. Wherever possible, the same reference numbers will be used throughout the drawings to refer to the same or like parts.

The present invention relates to a wireless access system. Hereinafter, the embodiments of the present invention disclose methods for determining coverage loss of a mobile station, which is being operated in a sleep mode, methods of efficient network re-entry, and an apparatus for performing the methods.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may make the subject matter of the present invention obscure will not be disclosed. Also, procedures or steps that may be understood by the person with ordinary skill in the art will not be disclosed.

In this specification, the embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station (BS) may be replaced with terms such as a fixed station, Node B, eNode B (eNB), and an access point (AP). Also, the mobile station may be replaced with terms such as a user equipment (UE), a subscriber station (SS), a mobile subscriber station (MSS), and a mobile terminal (MT).

Furthermore, a transmitting side means a fixed and/or mobile node that provides data services or voice services while a receiving side means a fixed and/or mobile node that receives data services or voice services. Accordingly, in an uplink, the mobile station could be a transmitting side while the base station could be a receiving side. Likewise, in a downlink, the mobile station could be a receiving side while the base station could be a transmitting side.

Meanwhile, in the present invention, examples of the mobile station include a personal digital assistant (PDA), a cellular phone, a personal communication service (PCS) phone, a global system for mobile (GSM) phone, a wideband CDMA (WCDMA) phone, and a mobile broadband system (MBS) phone.

The embodiments according to the present invention can be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention can be implemented by a type of a module, a procedure, or a function, which performs functions or operations described as above. For example, a software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify the technical features of the present invention can be supported by the above standard documents. Also, all terminologies disclosed herein can be described by the above standard documents. Particularly, the embodiments of the present invention can be supported by one or more standard documents of IEEE 802.16 system, i.e., P802.16e-2004, P802.16e-2005, P802.16Rev2, and IEEE P802.16m.

Specific terminologies hereinafter used in the embodiments of the present invention are provided to assist understanding of the present invention, and various modifications can be made in the specific terminologies within the range that they do not depart from technical spirits of the present invention.

In this specification, the present invention will be described based on the IEEE 802.16 system. In particular, it is assumed that a mobile station is an advanced mobile station (AMS) that satisfies specifications defined in the IEEE 802.16m standard and a base station is an advanced base station (ABS) of the same standard as that of the AMS.

Coverage Loss

First of all, "coverage loss" that can be applied to the embodiments of the present invention will be defined.

Coverage loss means that temporary signal loss occurs due to fading generated as a mobile station moves to a zone that loses a service zone (i.e., coverage) of a base station.

Next, an active base station timer (active_ABS_timer) will be defined.

The active base station timer means a timer maintained by the base station for each of mobile stations. The active base station timer can be started as initial network entry is completed based on completion of registration request/response (AAI_REG-REQ/AAI_REG-RSP) message exchange between the mobile station and the base station. Alternatively, the active base station timer can be started as network re-entry is completed based on handover (HO) process optimization included in a ranging response message. The active base station timer can be reset when the base station receives data from the mobile station. At this time, examples of the data include medium access control protocol data unit (MAC PDU (MPDU) and feedback information.

Also, the active base station timer may be started if a corresponding base station fails to receive a handover (HO) completion notification message from a network through a backbone network until a previously set time when the mobile station, which uses the corresponding base station as a serving base station, performs handover to another target base station. At this time, the previously set time is preferably the time indicated by ranging initiation deadline (Ranging_Initiation_Deadline) information.

Next, a resource retain timer will be defined.

If the active base station timer (Active_ABS_timer) expires for a specific mobile station, the base station performs a predetermined procedure for determining coverage loss of the corresponding mobile station. This procedure will be referred to as "coverage loss detection". The procedure of coverage loss detection will later be described in detail. If there is no response from the mobile station even after the procedure of coverage loss detection, the base station can start the resource retain timer. If the resource retain timer expires, the base station can release context of the corresponding mobile station.

Also, an active mobile station timer (Active_AMS_Timer) will be defined.

In the same manner as the aforementioned active base station timer, the active mobile station timer can be started as initial network entry is completed based on completion of registration request/response (AAI_REG-REQ/AAI_REG-RSP) message exchange between the mobile station and the base station. Alternatively, the active mobile station timer can be started as network re-entry is completed based on handover (HO) process optimization included in a ranging response message. The mobile station can identify that its connection context is retained in the network for the time when the active mobile station timer is maintained (i.e., until the active mobile station timer expires).

Next, the context retention identifier (CRID) will be defined.

The CRID can be allocated from the base station to the mobile station through the registration response (AAI_REG-RSP) message. The CRID is an identifier that can be used to identify the corresponding mobile station from the network (particularly, an entity (for example, authenticator ASN-GW) that retains connection information (context) of the corresponding mobile station or the base station). Also, the CRID may be used to identify the mobile station that is operated in a deregistration with context retention (DCR) mode. This CRID can be allocated to the mobile station through the registration response message, or may be updated through the ranging response (AAI_RNG-RSP) message during network re-entry or the deregistration response (AAI_DREG-RSP) message during DCR mode entry.

Hereinafter, methods for detecting coverage loss of the mobile station and the base station by using the aforementioned timers will be described with reference to FIG. 2.

Figure 2:
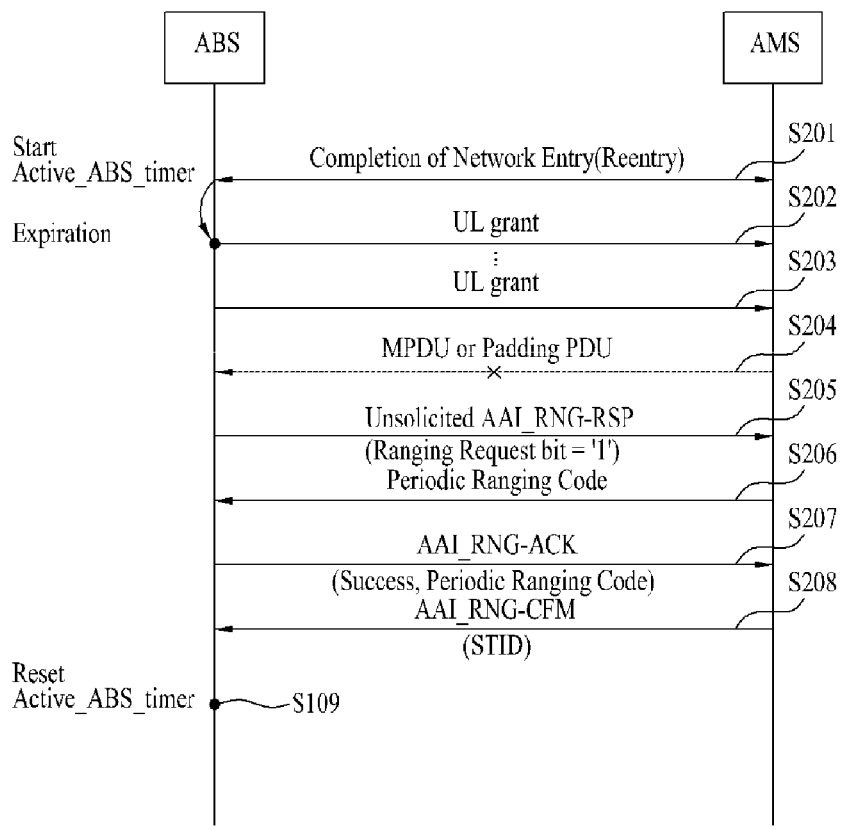
FIG. 2 is a diagram illustrating an example of a method for detecting coverage loss of a base station, which can be applied to the embodiments of the present invention.

FIG. 2 is a diagram illustrating an example of a method for detecting coverage loss of a base station, which can be applied to the embodiments of the present invention.

Referring to FIG. 2, first of all, in accordance with completion of initial network entry or completion of network re-entry, the base station starts the active base station timer for the corresponding mobile station while the mobile station starts the active mobile station timer (S201).

At this time, initial network entry can be completed by completion of registration request/response (AAI_REG-REQ/AAI_REG-RSP) message exchange between the mobile station and the base station, and network re-entry can be completed depending on handover (HO) process optimization included in the ranging response message. In case of initial network entry, context retention identifier (CRID) can be allocated to the mobile station through the registration response (AAI_REG-RSP) message. In case of network re-entry, new CRID can be allocated to the mobile station through the ranging response message (AAI_RNG-RSP) message.

At this time, if the active base station timer expires for the corresponding mobile station, the base station allocates uplink (UL) grant burst to identify the status of the corresponding mobile station (S202).

The mobile station transmits MPDU or a bandwidth request header (BR header) having a request bandwidth size of 0 to the base station through the allocated UL grant. If the base station receives the MPDU or BR header, the active base station timer can be reset.

However, the base station may receive none of data (MAC PDU that includes data or BR header) from the mobile station through uplink resources indicated by a predetermined number of contiguous UL grants (coverage loss detection UL grants) (S203, S204).

In this case, the base station transmits an unsolicited ranging response (AAI_RNG-RSP) message to the mobile station so that the mobile station performs periodic ranging based on a periodic ranging code. To this end, the base station sets a ranging request bit of the ranging response message to '1' (S205).

At this time, the base station can start a timer (for example, retry timer or T58 timer) that indicates standby time for receiving a message for ranging confirmation.

The mobile station transmits the periodic ranging code to the base station in accordance with a ranging request of the base station (S206).

The base station transmits a ranging acknowledgement (AAI_RNG-ACK) message to the mobile station in response to the ranging code (S207). At this time, the ranging acknowledgement message may include information (ranging status) indicating ranging success or failure and the ranging code transmitted from the mobile station.

The mobile station transmits a ranging confirmation (AAI_RNG-CFM) message to the base station in response to the ranging acknowledgement message (S208). At this time, the mobile station may include its station ID (STID) in the ranging confirmation message.

If the base station receives the ranging confirmation message transmitted from the mobile station, it updates the active base station timer (S209).

If the base station fails to receive the ranging confirmation (AAI_RNG-CFM) message until the T58 timer expires, it starts the resource retain timer, releases dynamic context of the corresponding mobile station, and moves static context to a network entity that stores context of the mobile station.

In the mean time, if physical (PHY) layer synchronization, downlink synchronization or uplink synchronization with the base station is failed, the mobile station can determine it as the coverage loss status. For example, if the mobile station fails to continuously receive a super frame header (SFH) equivalent to the number of previously set times ($N_{LOST\text{-}SFH}$), from the base station, it can determine the failure as coverage loss from the corresponding base station.

First Embodiment

One embodiment of the present invention suggests that coverage loss is determined by identifying whether the mobile station, which is being operated in a sleep mode, has successfully received a super frame header from a base station (i.e., the mobile station is synchronized with the base station).

Hereinafter, a method for receiving a super frame header and a method for determining coverage loss according to this embodiment will be described.

The mobile station periodically updates a super frame header (SFH) in a sleep mode. In other words, if the mobile station recognizes that the SFH has been updated, through a P-SFH IE, it awakes from the time (for example, the time when a corresponding S-SFH SP IE is transmitted just before a sleep window ends) when the updated S-SFH SP IE is transmitted, and updates the SFH. However, the mobile station, which is being operated in a sleep mode, may awake to detect the SFH but may fail to receive the SFH (for example, a listening window set in a frame unit may not be overlapped with SFH transmission position or the mobile station may not be synchronized with the base station). In this case, the mobile station of the sleep mode may awake from the sleep window to detect the SFH.

In particular, this embodiment suggests that the mobile station continues to maintain a wake-up status (namely, wake-up even for the sleep window) to successfully receive the SFH regardless of a sleep cycle if it fails to receive the SFH. Afterwards, if the mobile station receives the SFH (i.e., the mobile station is synchronized with the base station), it can be operated in accordance with the sleep cycle. On the other hand, if the mobile station fails to continuously receive the SFH as much as a predetermined number of times (i.e., $N_{LOST\text{-}SFH}$) it can determine it as a coverage loss status. In this case, the mobile station can perform a coverage loss recovery procedure. The coverage loss recovery procedure will be described later.

A method for operating a sleep mode in accordance with this embodiment will be described with reference to FIG. 3 to FIG. 5.

Figure 3:
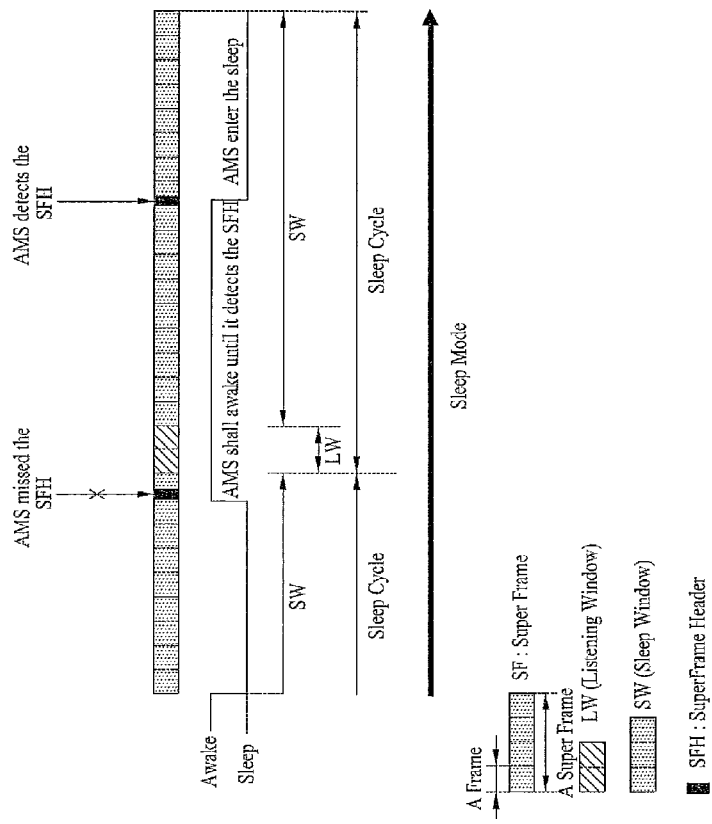
FIG. 3 is a diagram illustrating that a mobile station of a sleep mode successfully receives a super frame header for a sleep window in accordance with one embodiment of the present invention.
Figure 4:
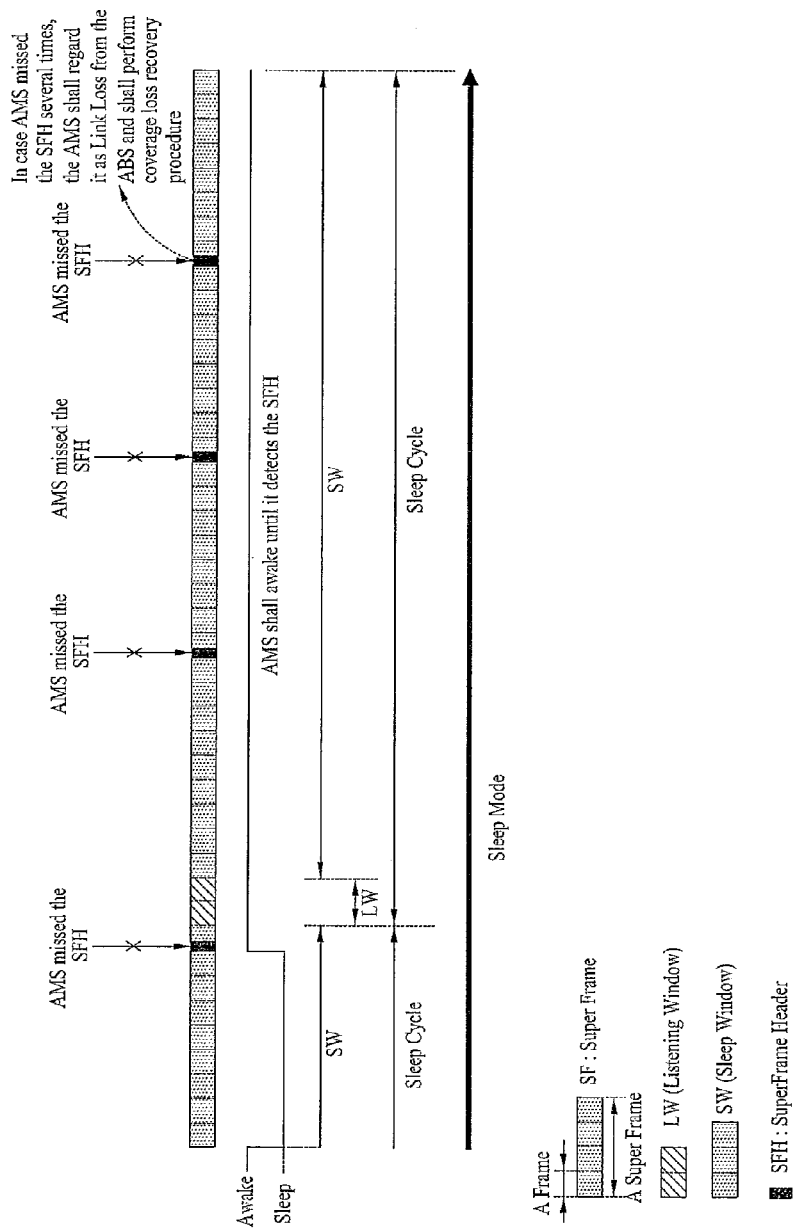
FIG. 4 is a diagram illustrating that a mobile station of a sleep mode fails to receive a super frame header for a sleep window in accordance with one embodiment of the present invention.

FIG. 3 is a diagram illustrating that a mobile station of a sleep mode successfully receives a super frame header for a sleep window in accordance with one embodiment of the present invention, and FIG. 4 is a diagram illustrating that a mobile station of a sleep mode fails to receive a super frame header for a sleep window in accordance with one embodiment of the present invention. Also, FIG. 5 is a diagram illustrating an example of a coverage loss recovery procedure according to one embodiment of the present invention.

First of all, referring to FIG. 3, since a frame to which the SFH is transmitted is located before a listening window starts, the mobile station which is being operated in a sleep mode awakes to receive the SFH even before the sleep window ends. However, if the mobile station fails to successfully receive the SFH, it continues to awake until next SFH transmission timing regardless of the listening window, and is operated in accordance with the sleep cycle if it receives the SFH. In FIG. 3, since the time when the SHF is received is the sleep window, the mobile station is operated in the sleep mode.

By contrast, when supposing that the value of $N_{LOST\text{-}SFH}$ is 4, if the mobile station additionally fails to receive the SFH three times in a state that the mobile station awakes after it fails to receive the SFH, it determines it as a coverage loss status and performs a coverage loss recovery procedure.

Hereinafter, the coverage loss recovery procedure according to this embodiment will be described with reference to FIG. 5.

Figure 5:
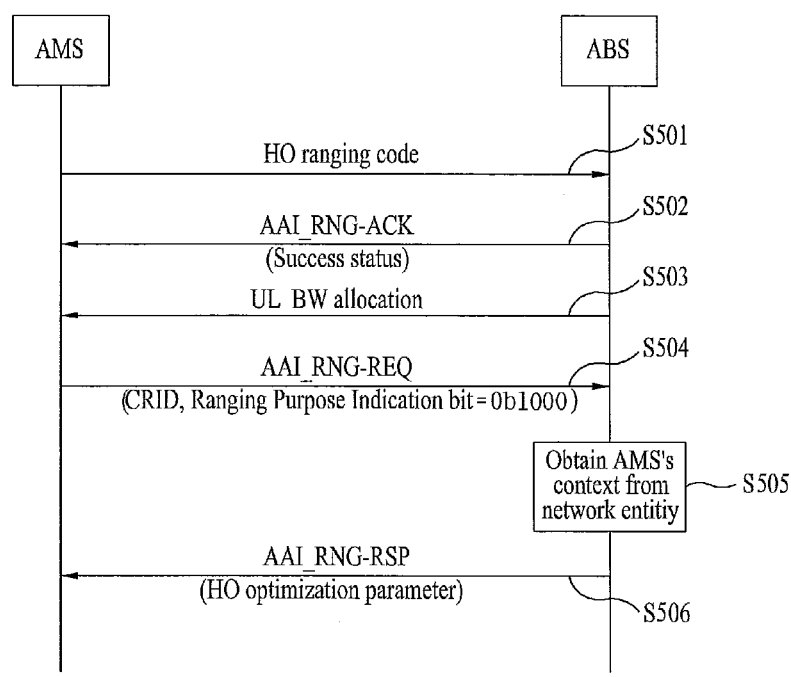
FIG. 5 is a diagram illustrating an example of a coverage loss recovery procedure according to one embodiment of the present invention.

FIG. 5 is a diagram illustrating an example of a coverage loss recovery procedure according to one embodiment of the present invention.

The mobile station scans a new channel to discover a base station if it determines the coverage loss status. If the base station is discovered, the mobile station synchronizes the discovered base station with a physical downlink (PHY DL) and transmits a handover (HO) ranging code to the base station (S501). At this time, the discovered base station may be the same as the previous serving base station or may be another base station.

The base station successfully receives a ranging code, transmits a ranging acknowledgement (AAI_RNG-ACK) message to the mobile station by setting it to a success status, and allocates an uplink bandwidth (UL BW) to the mobile station (S502 and S503).

The mobile station transmits a ranging request message having a ranging purpose indicator, which is set to a value (for example, 0b1000) indicating network re-entry due to coverage loss, to the base station through the allocated uplink resource (S504). At this time, the mobile station includes the CRID in the ranging request message, and protects the CRID using a cipher based message authentication code (CMAC) key generated as a new authentication key (AK) if security connection information is useful.

The base station can acquire the connection information of the mobile station by requesting the network entity that stores the connection information of the corresponding mobile station by using the CRID transmitted through the ranging request message (S505).

The base station determines a MAC control message, which can be omitted, by using the acquired connection information of the mobile station and transmits a ranging response (AAI_RNG-RSP) message to the mobile station by setting a handover optimization parameter (S506).

In other words, the omissible procedure (signaling, control MAC message) is omitted through a re-entry process optimization parameter of the AAI_RNG-RSP message, whereby the network re-entry procedure can be simplified.

At this time, the ranging response message may include station identifier (STID) for identifying the mobile station from the corresponding base station. If the CRID is updated, the ranging response message may further include new CRID. Also, if the CMAC value of the ranging request message transmitted from the mobile station is useful, the ranging response message can be encoded and transmitted to the mobile station.

Afterwards, the mobile station can perform the network re-entry procedure in accordance with the optimization parameter.

Second Embodiment

Another embodiment of the present invention suggests that coverage loss is determined using a value of the active base station timer.

The value of the active base station timer can be transmitted to the mobile station through a predetermined MAC message when the mobile station enters the sleep mode. In more detail, the mobile station is given the value of the active base station timer from the base station through the AAI_SLP-RSP message during a sleep mode initiation procedure. The mobile station can identify through the value of the active base station timer when the base station allocates UL grant to detect coverage loss. At this time, the time when the active base station timer is applied is preferably the time (i.e., frame indicated by a start frame number value and included in the AAI_SLP-RSP message) when the mobile station is operated in the sleep mode after the sleep mode initiation process ends.

The operation procedure of the mobile station when the value of the active base station timer is included in the AAI_SLP-RSP message will be described with reference to FIG. 6.

Figure 6:
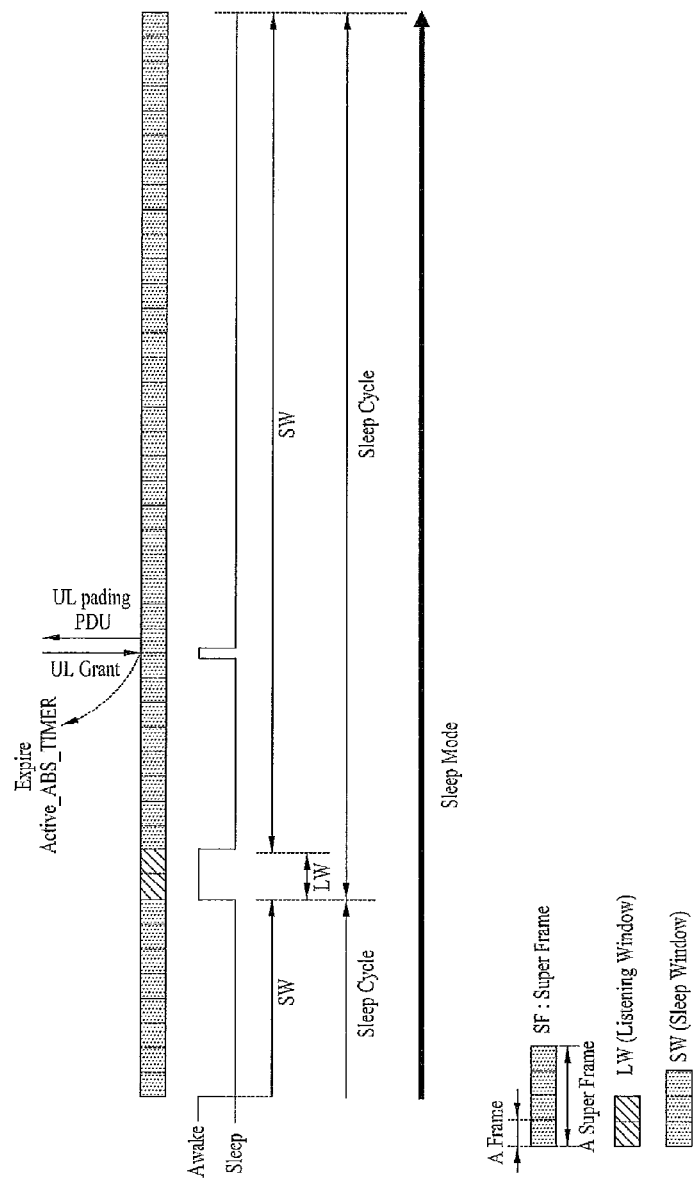
FIG. 6 is a diagram illustrating an example of a sleep mode operation procedure of a mobile station according to another embodiment of the present invention.

FIG. 6 is a diagram illustrating an example of a sleep mode operation procedure of a mobile station according to another embodiment of the present invention.

Referring to FIG. 6, the mobile station awakes at the time when the base station allocates UL grant to detect coverage loss, and is allocated with the UL grant and transmits a pending PDU (in case of no pending PDU, a BR header having a BR size of 0 or just padding bytes) to the base station through the UL resource indicated by the corresponding UL grant. Afterwards, the mobile station is again operated in accordance with the sleep cycle.

Third Embodiment

Other embodiment of the present invention suggests efficient transmission timing of UL grant allocated from a base station to a mobile station, which is operated in a sleep mode, to determine coverage loss of the corresponding mobile station.

In more detail, this embodiment suggests that if the time when the active base station timer expires is the sleep window interval, the base station allocates UL grant to the mobile station for a listening window closest to the time when the active base station timer expires.

Figure 7:
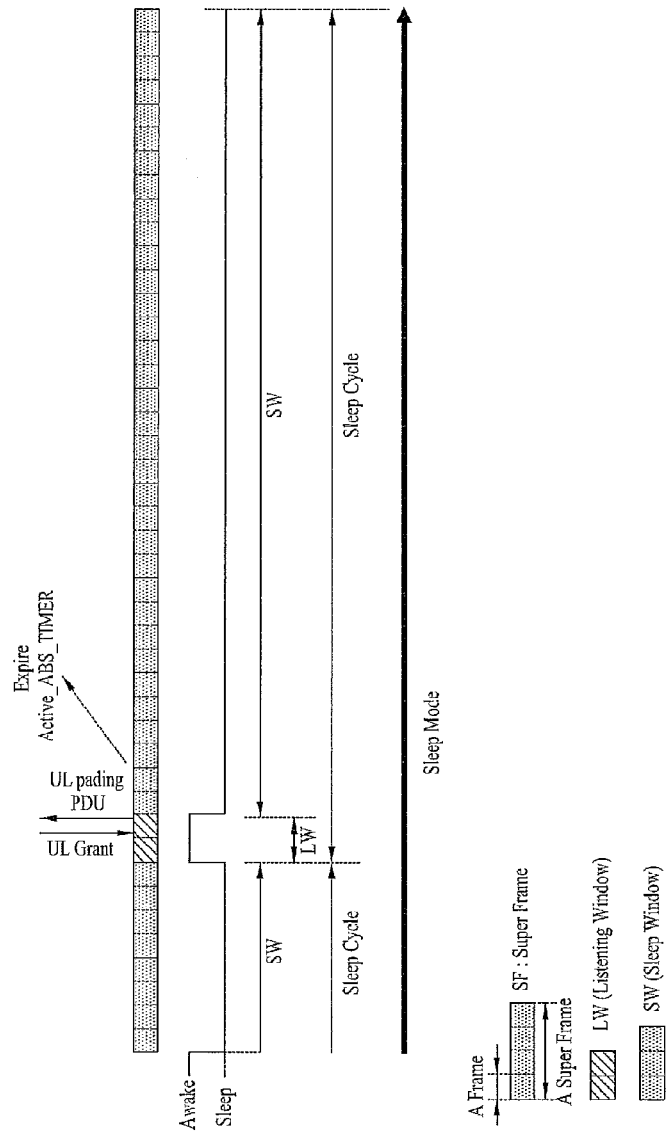
FIG. 7 is a diagram illustrating an example of a sleep mode operation procedure of a mobile station according to still another embodiment of the present invention.

FIG. 7 is a diagram illustrating an example of a sleep mode operation procedure of a mobile station according to still another embodiment of the present invention.

Referring to FIG. 7, since the end time of the third superframe, which corresponds to the time when the active base station timer expires, is the sleep window interval, the base station allocates the UL grant to the mobile station for the listening window existing at the second frame closest to the time when the active base station timer expires. As a result, the mobile station is allocated with the UL grant and transmits a pending PDU (in case of no pending PDU, a BR header having a BR size of 0) to the base station through the UL resource indicated by the corresponding UL grant. In this embodiment, since the UL grant is allocated for the listening interval of the mobile station, it is advantageous in that the mobile station does not need to know the value of the active base station timer and does not need to awake from the sleep window.

Fourth Embodiment

This embodiment of the present invention suggests that a base station transmits next periodic ranging parameter indicating timing information for allocating UL grant to a mobile station through a predetermined MAC message or header for a listening window during sleep mode initiation or sleep mode operation, so as to detect coverage loss of the mobile station of the sleep mode.

In this case, the next periodic ranging parameter may be an unsolicited sleep response message, and the header may be a sleep control header (SCH) or sleep control extended header (SCEH). This will be described with reference to FIG. 8.

FIG. 8 is a diagram illustrating an example of a sleep mode operation procedure of a mobile station according to further still another embodiment of the present invention.

Referring to FIG. 8, if the active base station timer ends for the sleep window of the mobile station, the base station previously transmits next periodic ranging parameter to the mobile station for the previous listening window to notify the mobile station of UL grant transmission timing. As a result, the mobile station awakes at the time indicated by the next periodic ranging parameter, is allocated with the UL grant, and transmits a pending PDU (in case of no pending PDU, a BR header having a BR size of 0) to the base station through the UL resource indicated by the corresponding UL grant. Afterwards, the mobile station is again operated in accordance with the sleep cycle.

The following Table 3 illustrates an example of the next periodic ranging parameter.

TABLE 1

| Name | Value | Usage |
| --- | --- | --- |
| Next periodic ranging | | This value indicates the offset of frame in which AMS shall be ready to perform a periodic ranging with respect to the frame where AAI_SLP-RSP/SCH/SCEH is transmitted. |

Configuration of Mobile Station and Base Station

As another embodiment of the present invention, the mobile station and the base station through which the embodiments of the present invention can be carried out will be described.

The mobile station is operated as a transmitter in an uplink, whereas the mobile station is operated as a receiver in a downlink. Also, the base station is operated as a receiver in the uplink, whereas the base station is operated as a transmitter in the downlink. In other words, each of the mobile station and the base station can include a transmitter and a receiver for transmission and reception of information or data.

The transmitter and the receiver can include a processor, a module, a part, and/or a means, for which the embodiments of the present invention are carried out. In particular, the transmitter and the receiver can include a module (means) for encoding messages, a module for decoding the encoded messages, and an antenna for transmitting and receiving messages. An example of the transmitter and the receiver will be described with reference to FIG. 9.

FIG. 9 is a block diagram illustrating an example of a transmitter and a receiver according to other embodiment of the present invention.

Referring to FIG. 9, the left side represents a structure of the transmitter while the right side represents a structure of the receiver. Each of the transmitter and the receiver can include an antenna 5, 10, a processor 20, 30, a Tx module 40, 50, an Rx module 60, 70, and a memory 80, 90. The respective elements can perform functions corresponding to those of counterparts. Hereinafter, the respective elements will be described in more detail.

The antenna 5, 10 serves to transmit a signal generated by the Tx module 40, 50 to the outside or receive a radio signal from the outside to transfer the radio signal to the Rx module 60, 70. If a MIMO function is supported, two or more antennas may be provided.

The antenna, the Tx module, and the Rx module can constitute a radio frequency (RF) module.

The processor 20, 30 generally controls the whole operation of the mobile station. For example, the processor 20, 30 can perform a controller function for performing the aforementioned embodiments of the present invention, a medium access control (MAC) frame variable control function according to service characteristics and radio wave condition, a handover function, an authentication and encryption function, etc. In more detail, the processor 20, 30 can perform the whole control for detecting restart of the base station and performing the network re-entry procedure as illustrated in FIG. 2 and FIG. 3.

Particularly, the processor of the mobile station can receive the SFH by awaking regardless of the sleep cycle at the time when the SFH is transmitted to determine coverage loss during sleep mode operation. At this time, if the processor of the mobile station fails to receive the SFH, it continues to awake without switching to a sleep status and receives next SFH. If the processor of the mobile station fails to receive the SFH as much as the number of previously set times, it can perform a coverage loss recovery procedure. In other words, the processor of the mobile station is controlled to transmit a ranging request message to the base station, wherein the ranging request message includes a ranging purpose indication field set to a value indicating network re-entry based on coverage loss and CRID. Afterwards, if the ranging response message is received from the base station, the processor of the mobile station can perform the optimized network re-entry procedure in accordance with the value of the handover (HO) process optimization field included in the ranging response message.

In addition, the processor of the mobile station can perform the whole control operation of the processes disclosed in the aforementioned embodiments.

The Tx module 40, 50 performs predetermined coding and modulation for data, which are scheduled from the processor 20, 30 and then transmitted to the outside, and then transfers the coded and modulated data to the antenna 10.

The Rx module 60, 70 performs decoding and demodulation for the radio signal received from the outside through the antenna 5, 10 to recover original data and then transfer the recovered data to the processor 20, 30.

The memory 80, 90 may store a program for processing and control of the processor 20, 30, or may perform a function for temporarily storing input/output data (restart count, etc.). Also, the memory 80, 90 can include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

In the mean time, the base station can perform a control function for performing the aforementioned embodiments of the present invention, an orthogonal frequency division multiple access (OFDMA) packet scheduling, time division duplex (TDD) packet scheduling and channel multiplexing function, a medium access control (MAC) frame variable control function based on service characteristics and radio wave condition, a quick traffic real-time control function, a handover function, an authentication and encryption function, a packet modulation and demodulation function for data transmission, a quick packet channel coding function and a real-time modem control function through at least one of the aforementioned modules, or can further include a separate means, module, or part for performing the aforementioned functions.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for detecting coverage loss of a mobile station operated in a sleep mode, in a wireless access system, the method performed by the mobile station and comprising:
    awaking just prior to a frame of a listening window followed by a sleep window of the sleep mode when a super frame header (SFH) is transmitted from a base station;
    staying awake until the super frame header is successfully detected during both the listening window and the sleep window when the detected result is a failure; and
    receiving uplink resource allocation information before an expiration of an active timer which is reset when the base station receives data from the mobile station,
    wherein when the mobile station is in the sleep mode, the mobile station receives the uplink resource allocation information at a listening window which is nearest to the expiration of the active timer.

2. The method of claim 1, further comprising:
    scanning for a new channel if detecting of the super frame header continuously fails as much as the number of previously set times;
    transmitting a first message to a base station discovered as a result of the scanning step, the first message including an identifier for identifying the mobile station in respect of connection information (context) of the mobile station and a ranging purpose indication field set to a value indicating network re-entry due to coverage loss; and
    receiving a second message from the discovered base station, the second message including optimization information indicating a procedure that can be omitted during the network re-entry.

3. The method of claim 2, further comprising:
    transmitting a handover ranging code to the discovered base station;
    receiving a third message from the discovered base station, the third message including information regarding a ranging status of the handover ranging code; and
    receiving uplink resource allocation information from the discovered base station if the ranging status is success, wherein the transmission of the first message is performed using an uplink resource indicated by the uplink resource allocation information.

4. The method of claim 3, wherein the first message is a ranging request (AAI_RNG-REQ) message, the second message is a ranging response (AAI_RNG-RSP) message, the third message is a ranging acknowledgement (AAI_RNG-ACK) message, the identifier is a context retention identifier (CRID), the value indicating network re-entry due to coverage loss is 0b1000, and the optimization information is a re-entry process optimization parameter.

5. The method of claim 1, wherein the mobile station operated in the sleep mode is configured to receive transmissions from the serving base station during the listening window except the sleep window.

6. The method of claim 1, further comprising:
    transmitting a response signal to the base station through an uplink resource indicated by the uplink resource allocation information.

7. The method of claim 6,
    wherein the response signal includes a media access control protocol data unit (MAC PDU) when transmission of the MAC PDU is pending, and
    wherein the response signal includes padding bytes when transmission of the MAC PDU is not pending.

8. A mobile station configured to perform a sleep mode in a wireless access system, the mobile station comprising:
    a processor; and
    a radio frequency (RF) module for transmitting and receiving a radio signal to and from the outside under the control of the processor,
    wherein the processor is configured to:
        awake just prior to a frame of a listening window followed by a sleep window of the sleep mode when a super frame header (SFH) is transmitted from a base station,
        stay awake until the super frame header is successfully detected during both the listening window and the sleep window when the detected result is a failure, and
        receive uplink resource allocation information before an expiration of an active timer which is reset when the base station receives data from the mobile station,
    wherein when the mobile station is in the sleep mode, the mobile station receives the uplink resource allocation information at a listening window which is nearest to the expiration of the active timer.

9. The mobile station of claim 8, wherein the processor is further configured to scan for a new channel if it fails to detect the super frame header continuously as much as the number of previously set times, transmit a first message to a base station discovered as a result of the scanning, the first message including an identifier for identifying the mobile station in respect of connection information (context) of the mobile station and a ranging purpose indication field set to a value indicating network re-entry due to coverage loss, and receive a second message from the discovered base station, the second message including optimization information indicating a procedure that can be omitted during the network re-entry.

10. The mobile station of claim 9, wherein the processor is further configured to transmit a handover ranging code to the discovered base station, receive a third message from the discovered base station, the third message including information regarding a ranging status of the handover ranging code, and receive uplink resource allocation information from the discovered base station if the ranging status is success, wherein the first message is transmitted using an uplink resource indicated by the uplink resource allocation information.

11. The mobile station of claim 10, wherein the first message is a ranging request (AAI_RNG-REQ) message, the second message is a ranging response (AAI_RNG-RSP) message, the third message is a ranging acknowledgement (AAI_RNG-ACK) message, the identifier is a context retention identifier (CRID), the value indicating network re-entry due to coverage loss is 0b1000, and the optimization information is a re-entry process optimization parameter.

12. The mobile station of claim 8, wherein the mobile station operated in the sleep mode is configured to receive transmissions from the serving base station during the listening window except the sleep window.

13. The mobile station of claim 8, wherein the processor is further configured to transmit a response signal to the base station through an uplink resource indicated by the uplink resource allocation information.

14. The mobile station of claim 13,
wherein the response signal includes a media access control protocol data unit (MAC PDU) when transmission of the MAC PDU is pending, and
wherein the response signal includes padding bytes when transmission of the MAC PDU is not pending.

* * * * *